Figure 1:
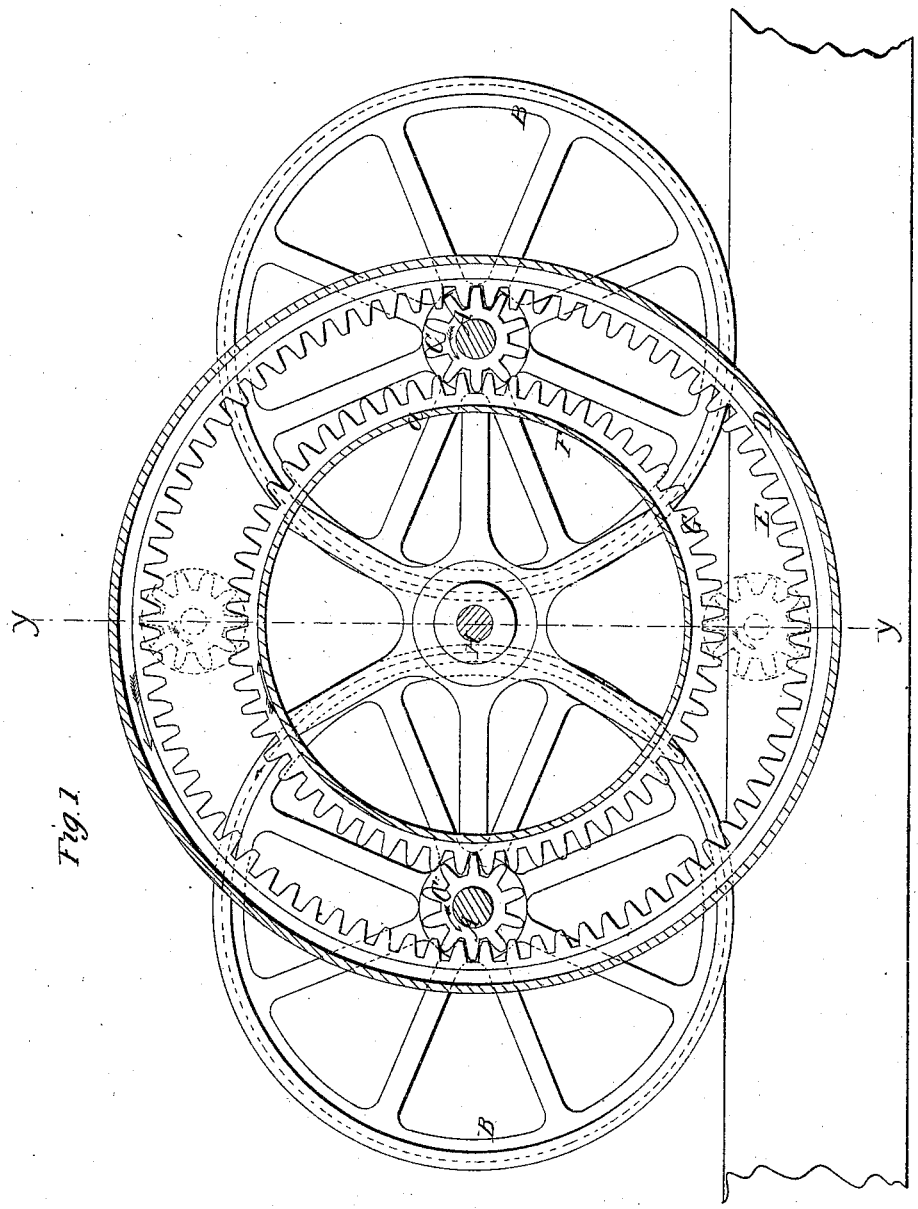

W. J. SAGE.
MODE OF PROPELLING CARS.

No. 34,269. Patented Jan. 28, 1862.

W. J. SAGE.
MODE OF PROPELLING CARS.
No. 34,269. Patented Jan. 28, 1862.
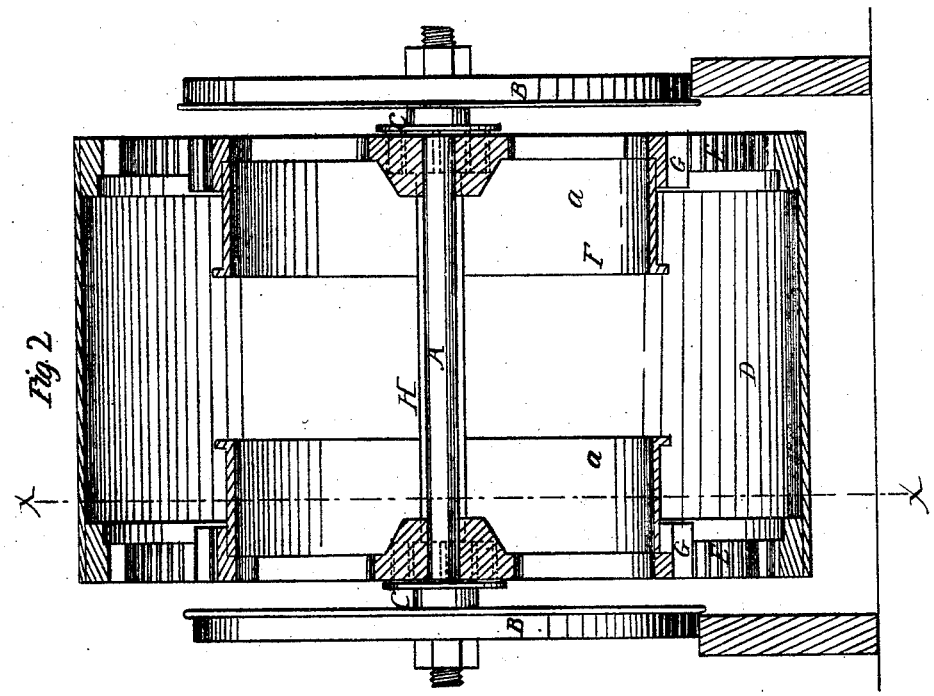

UNITED STATES PATENT OFFICE.

W. J. SAGE, OF STEUBENVILLE, OHIO.

MODE OF PROPELLING CARS.

Specification of Letters Patent No. 34,269, dated January 28, 1862.

*To all whom it may concern:*

Be it known that I, W. J. SAGE, of Steubenville, in the county of Jefferson and State of Ohio, have invented a new and Improved Mode of Applying Propelling-Power to Railroad-Cars; and I do hereby declare that the following is a full, clear, and exact description of the same, reference being had to the accompanying drawings, making a part of this specification, in which—

Figure 1, is a side sectional view of my invention taken in the line *x*, *x*, Fig. 2. Fig. 2, a vertical transverse section of the same, taken in the line *y*, *y*, Fig. 1.

Similar letters of reference indicate corresponding parts in the two figures.

The object of this invention is to apply the propelling power to railroad cars in such a way as to avoid the friction now produced by the weight of the cars on the axles of the wheels. To this end I have gears or pinions attached to the axles of the wheels, which gears or pinions are fitted between toothed rims on drums to which the power is applied as hereinafter described.

To enable those skilled in the art to fully understand and construct my invention I will proceed to describe it.

A, A, represent the two axles of a railroad car and B, the wheels attached thereto. On each axle A, there are placed two pinions C, C, which are near the wheels B.

D, is a drum or cylinder which has two toothed rims E, E, at its inner side, one at each end. The rims E, E, gear into the pinions C, at their outer sides, the drum or cylinder D, being of sufficient diameter to encompass both axles. Within the drum or cylinder D, there is placed a drum or cylinder F, which has two toothed rims G, G, at its outer side one at each end. The rims G, G, also gear into the pinions C, at their inner sides as shown in Fig. 1—the drum or cylinder F, being sufficiently small in diameter to admit of this.

In adapting the invention to horse or animal power I have the inner drum or cylinder F, made of two parts *a*, *a*, and the inner surface of the larger drum or cylinder D, is provided with transverse cleats or strips to serve as foot holds for the animal which is placed within the drum or cylinder D, the space between the two parts *a*, *a*, of the inner drum or cylinder admitting the body of the animal. The power of the animal is directly applied to the drum or cylinder D, and the pinions C, and wheels B, are rotated by the movement of said cylinder. If desirable smaller animals, mules for instance, may be placed in the smaller drum or cylinder F, and the mules may be attached to the same whiffle tree or double tree as the horse so that the latter will pull or draw against the mules as the latter will pull in a reverse direction to the horse thus enabling all the animals to apply their power to the best advantage. It will be understood of course that the drums or cylinders D, F, rotate in reverse directions and hence it will be seen that the above described mode of attaching the animals may be very readily adopted. When a single animal is employed it may be attached to a mechanism connected with the axis H, of drum F, as it will be necessary for the animal to pull from a fixed object in order that he may apply his strength to advantage.

In applying steam power the engine is suspended from the axis H, of the inner drum F, and the power applied to one or both of the drums or cylinders D, F.

It is not necessary that the drums D, F, be concentric; the device will operate when the axis of the inner drum or cylinder F, is either above or below the center of drum D. If however the rims G, G, of the drum D, are placed in gear with the rims E, E, of the drum or cylinder D, the apparatus will be locked and incapable of being propelled.

I design to have the passenger and freight cars constructed precisely like the one herein described, the bodies of said cars being suspended on the axis H, of the inner drum or cylinder F, in any proper way, and the several cars may be connected together by means of rods attached to the ends of the axis H, of the drum or cylinder F.

By this invention it will be seen that the friction attending the weight of the car on the axles is avoided. The rolling friction, that is to say, that produced by the passage of the wheels over the rails, is of course the same as usual but that is comparatively small as is also the friction attending the operation of the gearing.

If necessary or desirable one or more pinions, see dotted lines, may be interposed between the toothed rims E, G, of the drums or cylinders D, F. The axis of these pinions if extended, one or more of them, may form desirable attachments for friction brakes.

The drums or cylinders D, F, may be of wood with the toothed rims E, G, of cast metal bolted or attached thereto in any proper way.

When horse power is designed to be applied to the invention the drum B, should be about 12 feet in diameter this would be sufficiently large to admit of the horse being placed in it, the other parts will be about in the proportion shown in the drawings. The smaller drum F, although necessarily smaller will be sufficiently large to receive mules. When the invention is designed for the application of steam power the drum B, is made sufficiently large to receive the boiler and engine which will of course vary in size according to the power required.

In suspending the engine to the axis H, the former has the boiler attached and the driving gears mesh into the toothed rims E, E, as shown in red in Fig. 1. It will be understood that the axis H, as designed to pass loosely through the suspension rods of the engine in order that the axis may turn freely in them I would also remark that the rods employed for connecting several cars together are simply fitted loosely on the ends of the axis H, so that the latter may rotate freely in them. These rods are also shown in red in both figures.

Having thus described my invention what I claim as new and desire to secure by Letters Patent, is:

The two drums or cylinders D, F, provided with the toothed rims E, G, with the pinions C, of the axles A, placed between them as and for the purpose herein set forth.

W. J. SAGE.

Witnesses:
  WILLIAM KENYON,
  GEORGE McFEELY.